United States Patent
Yang et al.

(10) Patent No.: US 10,555,295 B2
(45) Date of Patent: Feb. 4, 2020

(54) BASE STATION AND OPERATION METHOD THEREOF IN WIRELESS COMMUNICATION SYSTEM

(71) Applicant: Samsung Electronics Co., Ltd., Suwon-si, Gyeonggi-do (KR)

(72) Inventors: Hayoung Yang, Yongin-si (KR); Jinhwan Kang, Bucheon-si (KR); Chongdon Kim, Seongnam-si (KR); Ikbeom Lee, Seongnam-si (KR); Joohyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/824,464

(22) Filed: Nov. 28, 2017

(65) Prior Publication Data

US 2018/0152932 A1    May 31, 2018

(30) Foreign Application Priority Data

Nov. 28, 2016 (KR) .................. 10-2016-0159093

(51) Int. Cl.
*H04W 72/04* (2009.01)
*H04W 88/02* (2009.01)
(Continued)

(52) U.S. Cl.
CPC .......... *H04W 72/044* (2013.01); *H04B 15/00* (2013.01); *H04W 72/082* (2013.01);
(Continued)

(58) Field of Classification Search
CPC ... H04W 52/04; H04W 72/082; H04W 88/02; H04W 72/04; H04W 88/08; H04W 88/10; H04B 15/00; H04L 67/12; H04L 27/26
See application file for complete search history.

(56) References Cited

U.S. PATENT DOCUMENTS 8,433,015 B2    4/2013 Downey et al.
8,594,049 B2    11/2013 Ohta
(Continued)

FOREIGN PATENT DOCUMENTS

EP          2991238 A1    3/2016
KR      10-1002885 B1    12/2010
WO      2016-122268 A1    8/2016

*Primary Examiner* — Khawar Iqbal
(74) *Attorney, Agent, or Firm* — Jefferson IP Law, LLP

(57) ABSTRACT

A communication method and system for converging a fifth generation (5G) communication system supporting a data rate higher than that of a fourth generation (4G) system with internet of things (IoT) technology are provided. A system-specific resource allocation method of a base station supporting multiple communication systems is provided in order for the base station to improve qualities of system-specific signals. The method includes allocating a first resource for a first system operating with a first transmit power and a second resource for a second system operating with a second transmit power to at least one terminal and receiving a signal including a first signal corresponding to the first system and a second signal corresponding to the second system on the first resource and the second resource from the at least one terminal, the first resource and the second resource being identical in position with each other in a resource grid.

19 Claims, 10 Drawing Sheets

(51) Int. Cl.
  *H04L 27/26* (2006.01)
  *H04B 15/00* (2006.01)
  *H04W 72/08* (2009.01)
  *H04L 29/08* (2006.01)
  *H04W 88/08* (2009.01)

(52) U.S. Cl.
  CPC ............. *H04L 67/12* (2013.01); *H04W 88/02* (2013.01); *H04W 88/08* (2013.01)

(56) References Cited

U.S. PATENT DOCUMENTS

| | | |
|---|---|---|
| 10,419,171 B2 * | 9/2019 | Park .................... H04L 5/0048 |
| 2008/0248803 A1 | 10/2008 | Lee et al. |
| 2014/0301268 A1 | 10/2014 | Xu et al. |
| 2015/0326324 A1 | 11/2015 | Lee et al. |
| 2015/0326360 A1 | 11/2015 | Malladi et al. |
| 2016/0044681 A1 * | 2/2016 | Zhou .................... H04L 5/0051 370/329 |
| 2016/0095095 A1 | 3/2016 | Lorca et al. |
| 2016/0119072 A1 | 4/2016 | Wang |
| 2017/0230087 A1 * | 8/2017 | Sun ...................... H04B 7/024 |
| 2017/0339697 A1 * | 11/2017 | Park .................... H04L 5/0044 |
| 2018/0006763 A1 | 1/2018 | Kim et al. |
| 2018/0048436 A1 * | 2/2018 | Park .................... H04L 5/0007 |
| 2018/0124636 A1 * | 5/2018 | Ly ...................... H04L 5/0044 |
| 2018/0212660 A1 * | 7/2018 | Gao .................... H04B 7/0634 |
| 2018/0270829 A1 * | 9/2018 | Matsumura .......... H04W 72/04 |
| 2018/0375626 A1 * | 12/2018 | Kim .................... H04L 27/34 |
| 2019/0053014 A1 * | 2/2019 | Liu .................... H04W 4/029 |
| 2019/0081825 A1 * | 3/2019 | Pajukoski ............ H04L 25/03 |
| 2019/0132106 A1 * | 5/2019 | Tang .................. H04W 76/11 |
| 2019/0191444 A1 * | 6/2019 | Park .................... H04L 5/00 |
| 2019/0208482 A1 * | 7/2019 | Tooher ................ H04L 5/005 |
| 2019/0261277 A1 * | 8/2019 | Nammi ................ H04B 7/0626 |
| 2019/0261380 A1 * | 8/2019 | Iyer .................... H04B 7/0421 |
| 2019/0288894 A1 * | 9/2019 | Boudreau ........... H04L 27/2613 |

* cited by examiner

BASE STATION AND OPERATION METHOD THEREOF IN WIRELESS COMMUNICATION SYSTEM

CROSS-REFERENCE TO RELATED APPLICATION(S)

This application claims the benefit under 35 U.S.C. § 119(a) of a Korean patent application filed on Nov. 28, 2016 in the Korean Intellectual Property Office and assigned Serial number 10-2016-0159093, the entire disclosure of which is hereby incorporated by reference.

TECHNICAL FIELD

The present disclosure relates to a wireless communication system. More particularly, the present disclosure relates to a system-specific resource allocation method of a base station supporting multiple communication systems in order for the base station to improve qualities of system-specific signals.

BACKGROUND

In order to meet the increasing demand for wireless data traffic since the commercialization of $4^{th}$ generation (4G) communication systems, the development focus is on the $5^{th}$ generation (5G) or pre-5G communication system. For this reason, the 5G or pre-5G communication system is called a beyond 4G network communication system or post long-term evolution (LTE) system. Consideration is being given to implementing the 5G communication system in millimeter wave (mmW) frequency bands (e.g., 60 GHz bands) to accomplish higher data rates. In order to increase the propagation distance by mitigating propagation loss in the 5G communication system, discussions are underway about various techniques, such as beamforming, massive multiple-input multiple output (MIMO), full dimensional MIMO (FD-MIMO), array antenna, analog beamforming, and large-scale antenna. In addition, in order to enhance network performance of the 5G communication system, developments are underway of various techniques, such as evolved small cell, advanced small cell, cloud radio access network (RAN), ultra-dense network, device-to-device (D2D) communication, wireless backhaul, moving network, cooperative communication, coordinated multi-points (CoMP), and interference cancellation. Furthermore, the ongoing research includes the use of hybrid frequency shift keying (FSK) and quadrature amplitude modulation (QAM){FQAM} and sliding window superposition coding (SWSC) as advanced coding modulation (ACM), filter bank multi-carrier (FBMC), non-orthogonal multiple access (NOMA), and sparse code multiple access (SCMA).

Meanwhile, the Internet is evolving from a human-centric communication network in which information is generated and consumed by humans to the Internet of things (IoT) in which distributed things or components exchange and process information. The combination of the cloud server-based Big data processing technology and the IoT begets Internet of everything (IoE) technology. In order to secure the sensing technology, wired/wireless communication and network infrastructure, service interface technology, and security technology required for implementing the IoT, recent research has focused on sensor network, machine-to-machine (M2M) communication, and machine-type communication (MTC) technologies. In the IoT environment, it is possible to provide an intelligent Internet Technology that is capable of collecting and analyzing data generated from connected things to create new values for human life. The IoT can be applied to various fields, such as smart home, smart building, smart city, smart car or connected car, smart grid, health care, smart appliance, and smart medical service through legacy information technology (IT) and convergence of various industries.

Thus, there are various attempts to apply the IoT to the 5G communication system. For example, the sensor network, M2M communication, and MTC technologies are implemented by means of the 5G communication technologies, such as beamforming, MIMO, and array antenna. The application of the aforementioned cloud RAN as a big data processing technology is an example of convergence between the 5G and IoT technologies.

Therefore, a need exists for an enhanced resource allocation method of a base station supporting multiple different communication systems.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a base station and a resource allocation method thereof that is capable of supporting multiple communication system services without compromising resources for a normal communication system.

In accordance with an aspect of the present disclosure, an operation method of a base station is provided. The method includes allocating a first resource for use of a first system operating with a first transmit power and a second resource for use of a second system operating with a second transmit power to at least one terminal and receiving a signal including a first signal corresponding to the first system and a second signal corresponding to the second system on the first resource and the second resource from the at least one terminal, wherein the first resource and the second resource are identical in position with each other in a resource grid.

In accordance with another aspect of the present disclosure, a base station is provided. The base station includes a transceiver configured to transmit and receive signals and at least one processor configured to allocate a first resource for use of a first system operating with a first transmit power and a second resource for use of a second system operating with a second transmit power to at least one terminal and control the transceiver to receive a signal including a first signal corresponding to the first system and a second signal corresponding to the second system on the first resource and the second resource from the at least one terminal, wherein the first resource and the second resource are identical in position with each other in a resource grid.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
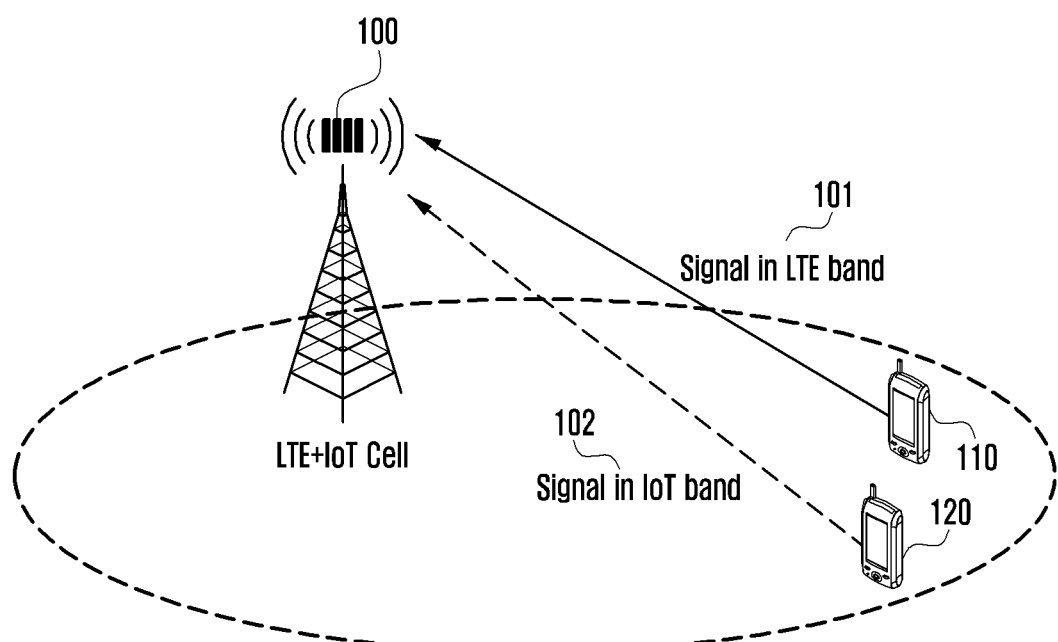
FIG. 1 is a diagram illustrating a scenario where a base station serves terminals transmitting signals in different frequency bands of two different communication systems according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Detailed descriptions of well-known functions and structures incorporated herein may be omitted to avoid obscuring the subject matter of the present disclosure. This aims to omit unnecessary description so as to make the subject matter of the present disclosure clear.

For the same reason, some elements are exaggerated, omitted, or simplified in the drawings and, in practice, the elements may have sizes and/or shapes different from those shown in the drawings. The same reference numbers are used throughout the drawings to refer to the same or like parts.

Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce manufacture articles embedding instruction means which implement the function/act specified in the flowcharts and/or block diagrams. The computer program instructions may also be loaded onto a computer or other programmable data processing apparatus to cause a series of operational operations to be performed on the computer or other programmable apparatus to produce a computer implemented process such that the instructions which are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present disclosure, the term "module", means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components (such as software components, object-oriented software components, class components and task components), processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more central processing units (CPUs) in a device or a secure multimedia card.

In the following description, the term "terminal" is intended to include mobile terminals and devices registered with a mobile communication system to receive services from the mobile communication system. Examples of the mobile terminal may include, but are not limited to, smart devices, such as a smartphone and a tablet personal computer (PC).

In line with the expansion of the necessity of Internet of things (IoT) communication to all fields, the need for convergence and coexistence among legacy and next generation mobile communication systems is growing in view of role assignment, spectrum allocation, service coverage, etc.

For example, the enhanced machine-type communication (MTC) (eMTC) and narrow band-IoT (NB-IoT) technologies have been specified to be compatible with the physical layer standard of legacy long-term evolution (LTE) and are expected to be used in various forms of services.

FIG. 1 is a diagram illustrating a scenario where a base station serves terminals transmitting signals in different frequency bands of two different communication systems according to an embodiment of the present disclosure.

Referring to FIG. 1, assuming that the two different communication systems are an IoT system and a long term evolution (LTE) system, a base station 100 may receive signals transmitted by a first terminal 110 on LTE resources. The base station 100 may also receive signals transmitted by a second terminal 120 on IoT resources.

As shown in FIG. 1, the base station 100 may operate an LTE cell 101 and an IoT cell 102 that have the same coverage area. However, FIG. 1 shows just an embodiment, and it may be possible to consider a cell deployment in which one of multiple LTE cells is configured to support IoT because the radius of the IoT cell 102 can be extended with link performance improvement through repetitive physical channel transmission.

First, a description is made of the normal resource allocation method in an environment where an LTE system coexists with a different communication technology.

If the different communication technology is eMTC, the terminal supporting the eMTC may operate with a basic bandwidth of a system band comprised of 6 resource blocks (6 RBs, 1 RB=180 kHz). Accordingly, it may be possible to allocate part of the legacy LTE band as an eMTC band.

Meanwhile, the NB-IoT may operate with a basic bandwidth of 1 RB narrower than that of the eMTC. In this case, the base station may allocate part of the legacy LTE band (in-band) or a frequency outside the legacy LTE band (guard-band) as an NB-IoT band. In the case of deploying the NB-IoT in the guard-band, the base station may operate the NB-IoT in standalone mode.

Figure 2A:
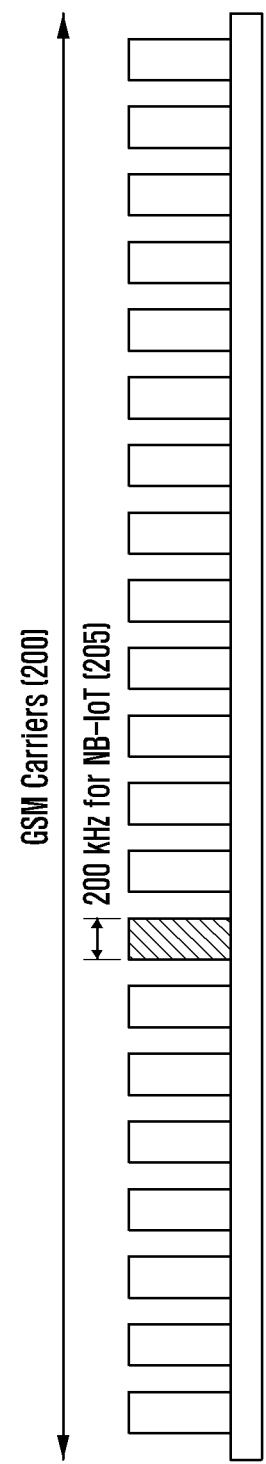
FIGS. 2A, 2B and 2C are diagrams illustrating scenarios of frequency band allocation for narrow band-IoT (NB-IoT) communication and legacy long-term evolution (LTE) communication according to an embodiment of the present disclosure.
Figure 2B:
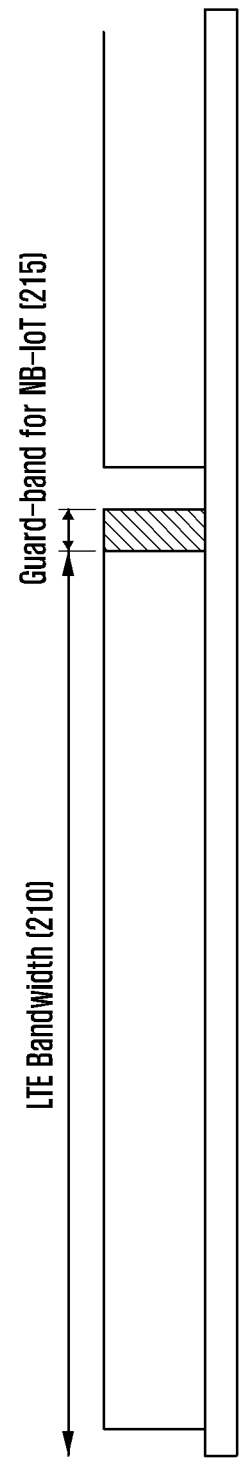
Figure 2C:
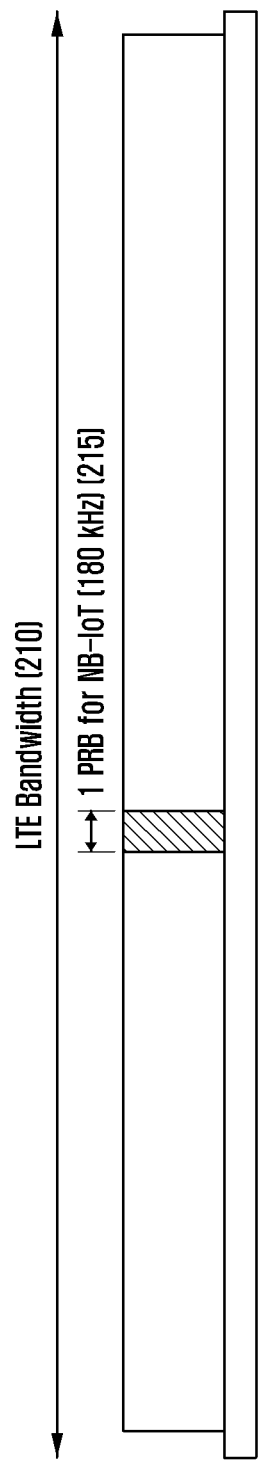

FIGS. 2A to 2C are diagrams illustrating scenarios of frequency band allocation for NB-IoT communication and legacy LTE communication according to an embodiment of the present disclosure.

Referring to FIG. 2A, for NB-IoT 205, a base station may allocate one of global system for mobile communication (GSM) carriers 200 as a frequency band for NB-IoT 205.

Referring to FIGS. 2B and 2C, the base station may allocate an LTE guard-band outside an LTE bandwidth 210 or an LTE in-band inside the LTE bandwidth 210 as a frequency band for NB-IoT 215.

Although FIGS. 2A to 2C are directed to a case of deploying NB-IoT, it may also be possible to deploy the eMTC for operation in the in-band mode.

In the case that the base station supports the LTE system and the IoT system in the in-band mode simultaneously, the frequency band allocation for the IoT system causes LTE bandwidth reduction as summarized in Tables 1 and 2. Table 1 shows physical layer resource reduction rates on a downlink channel, and Table 2 shows physical resource reduction rates on an uplink channel.

TABLE 1

| | Cell Tput | | Single UE Peak Tput | |
|---|---|---|---|---|
| Case | eMTC[1] | NB-IoT In-band[2] | eMTC[1] | NB-IoT In-band[2] |
| 3 MHz | 40.0% | 6.7% | 46.7% | 13.3% |
| 5 MHz | 24.0% | 4.0% | 27.0% | 8.0% |
| 10 MHz | 12.0% | 2.0% | 17.8% | 6.0% |
| 15 MHz | 8.0% | 1.3% | 11.9% | 5.3% |
| 20 MHz | 6.0% | 1.0% | 8.0% | 4.0% |

[1]eMTC: occupy 6 RBs
[2]NB-IoT In-band: occupy 1 RB
(3) Single UE peak is limited to RBG allocation and thus causes loss by RBG.

TABLE 2

| | Cell Tput | | Single UE Peak Tput | |
|---|---|---|---|---|
| Case | eMTC[1] | NB-IoT In-band[2] | eMTC[1] | NB-IoT In-band[2] |
| 3 MHz | 46.2% | 7.7% | 50.0% | 16.7% |
| 5 MHz | 26.1% | 4.3% | 20.0% | 0% |
| 10 MHz | 13.0% | 2.2% | 16.7% | 10.4% |
| 15 MHz | 8.5% | 1.4% | 0% | 0% |
| 20 MHz | 6.3% | 1.0% | 6.3% | 6.3% |

[1]Number of PUCCH RBs is reflected, and number of physical random access channel (PRACH) RBs is not reflected
[2]eMTC: occupy 6 RBs
(3) NB-IoT In-band: occupy 1 RB
(4) LTE single UE peak is limited to a multiple of 2, 3, or 5, and there is no extra loss for NB-IoT in-band mode in 5 MHz and 15 MHz bandwidths.

According to an embodiment of the present disclosure, the base station may allocate the eMTC or NB-IoT resources and the LTE resources in a time division manner so as to appear alternately. Even in this case, the LTE resources are reduced in comparison with the standalone LTE system.

Figure 3:
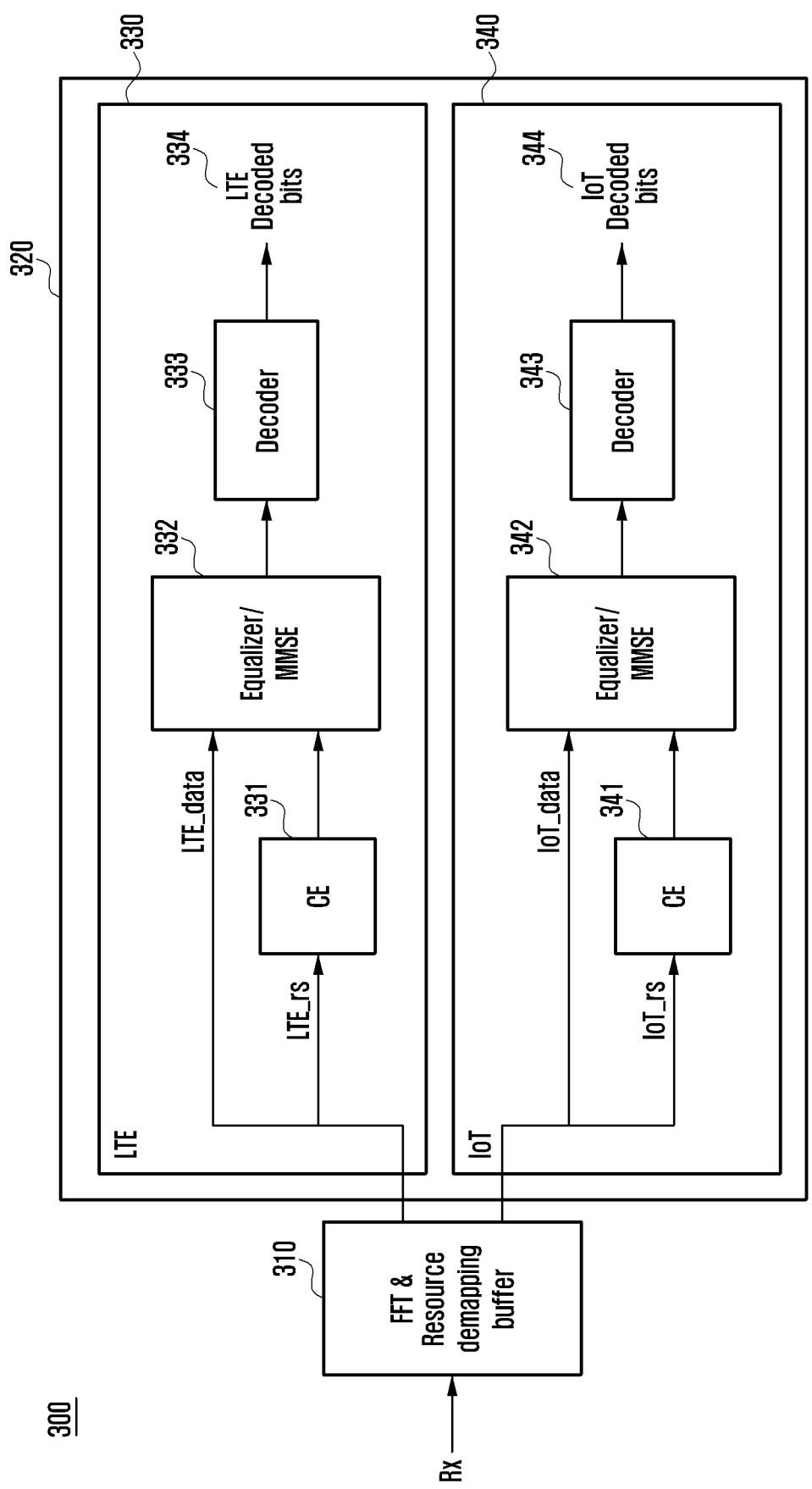
FIG. 3 is a diagram illustrating a system-specific uplink signal handling process of a processor of a base station according to an embodiment of the present disclosure.

FIG. 3 is a diagram illustrating a system-specific uplink signal handling process of a processor of a base station according to an embodiment of the present disclosure.

Referring to FIG. 3, in the case where the base station supports an IoT system and an LTE system simultaneously, the base station may decode the signals in a system-specific manner by means of a processor 300 configured as shown in FIG. 3.

If the IoT system and the LTE system use the same subcarrier spacing, the processor 300 may perform fast Fourier transform (FFT) and resource de-mapping on the received signal by means of an FFT & Resource de-mapping buffer 310.

Otherwise, if the IoT system and the LTE system use different subcarrier spacings, the two systems may operate with different sampling rates and FFT sizes and, as a consequence, the two different system-specific signals have to pass the system-specific FFT and de-mapping blocks, separately unlike the configuration of FIG. 3.

A brief description is made hereinafter of the typical signal decoding method for the case where the IoT system and the LTE system use the same subcarrier spacing.

The processor 300 may include a signal processor 320. The signal processor 320 may include an LTE signal processor 330 and an IoT signal processor 340. The LTE and IoT signal processors 330 and 340 may be implemented separately in hardware or as software entities or programs installed in the signal processor 320 implemented in hardware according to an embodiment of the present disclosure.

The LTE signal processor 330 may perform channel estimation on a received reference signal by means of a channel estimator 331. The LTE signal processor 330 may include an equalizer 332, which may perform equalization on the received data signal based on the channel estimation result. The LTE signal processor 330 may include a decoder 333, which may perform decoding on the equalized signal to output an LTE signal 334.

Similarly, the IoT signal processor 340 may perform channel estimation on a received reference signal by means of a channel estimator 341. The IoT signal processor 340 may include an equalizer 342 which may perform equalization on the received data signal based on the channel estimation result and a decoder 343 which may perform decoding on the equalized signal to output an IoT signal 344.

According to an embodiment of the present disclosure, if the LTE and IoT signals are received on the same resources, the resource amounts for the respective systems may increase. In the course of processing the signals received on the same resources, the system-specific signals may interfere with each other. In order to address the inter-system interference on the physical layer, an interference cancellation (IC) technique may be adopted. For example, the IC technique may operate in such a way of recovering the original system-specific signals based on the decoding results through different streams as being processed by the processor 300 of FIG. 3, canceling one signal from another, and decoding the signal from which the other signal is removed to achieve performance gain.

In the case where the base station adopts the IC technique, the base station performs decoding on an interference signal, regenerates the decoded interference signal, removes the regenerated signal from a received signal, and performs decoding on a signal obtained by removing the regenerated signal from the received signal.

The base station supporting both the LTE and IoT systems simultaneously may perform decoding on the system-specific signals by means of the processor 300 of FIG. 3. In order to adopt the above-described IC technique, the processor 300 of the base station should be configured to perform an additional operation of regenerating the decoded interference signal.

In the case where communication systems deployed for different purposes operate simultaneously, in terms of performance enhancement it is advantageous to perform mutual IC and then decoding on its own signal. However, the process of decoding its own signal after performing IC increases implementation complexity and processing latency.

In the case of LTE, there are delay constraints in the decoding process, such as hybrid automatic repeat request (HARQ) retransmission period. Thus, the extra IC process is likely to be burdensome. Meanwhile, the IoT is characterized by signal retransmission for coverage extension, which is likely to increase the processing latency. According to an embodiment of the present disclosure, it is more practical to perform IC on the IoT signal to remove an LTE signal component.

In view of performance gain, an increase in capacity, i.e., data rate, may be expected by applying IC to the case where two signals transmitted at different transmit power levels are superposed.

Typically, an IoT signal is likely to have a transmit power lower than that of an LTE signal in consideration of battery life and coverage of the terminal. Similar to the superposition coding technique, which uses power difference between two systems, it may be possible to use a shared-resource multi-access technique.

Figure 4:
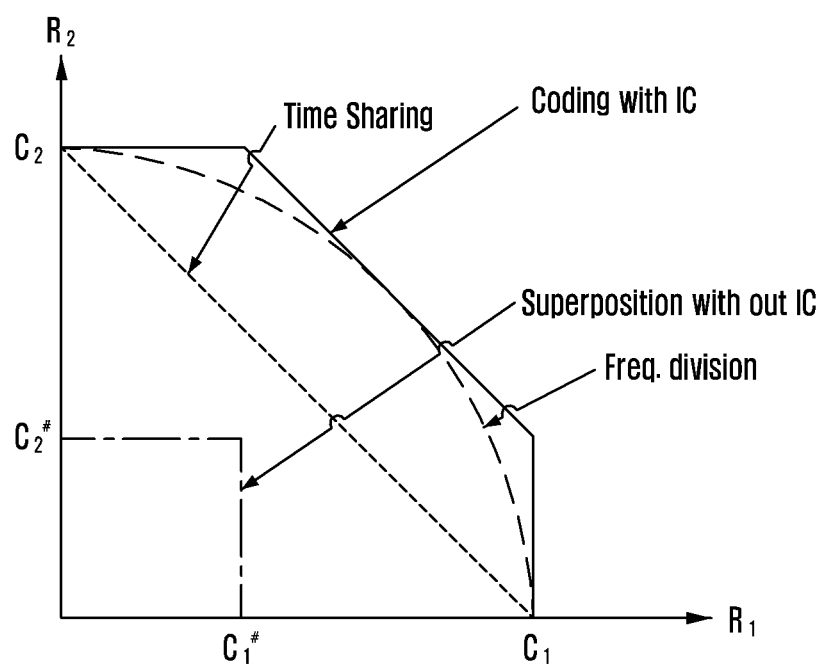
FIG. 4 is a graph for comparing capacity gains, i.e., rate regions, of time-division, frequency-division, and code-division transmissions in given resources according to an embodiment of the present disclosure.

FIG. 4 is a graph for comparing capacity gains, i.e., rate regions, of time-division, frequency-division, and code-division transmissions in given resources according to an embodiment of the present disclosure.

Referring to FIG. 4, capacities $c_i$ and $c_i^*$ of two signals transmitted simultaneously are expressed by equations (1) and (2), respectively.

$$c_i = B\log\left[1 + \frac{P_i}{nB}\right], i = 1, 2 \quad \text{Equation 1}$$

$$c_1^* = B\log\left[1 + \frac{P_1}{nB + P_2}\right] \text{ and } C_2^* = B\log\left[1 + \frac{P_2}{nB + P_1}\right] \quad \text{Equation 2}$$

In the equations, B denotes a signal bandwidth, $P_i$ denotes a signal power, and n denotes additive Gaussian noise power of the receiver. In FIG. 4, the point $(C_1, O)$ shows that a first terminal transmits a signal at the highest data rate while a) second terminal transmits no signal. Meanwhile, the point $(O, C_2)$ shows that the second terminal transmits a signal at the highest data rate while the first terminal transmits no signal. In the rate regions, $(C_1, C_2^*)$ and $(C_1^*, C_2)$ are rate points obtained by performing successive IC on the superposed signals transmitted by two terminals in the code-division transmission mode. Assuming that the first terminal transmits a signal at the maximum data rate $C_1$, the signal transmitted by the first terminal acts as interference to the signal transmitted by the second terminal. From this, equation (2) is derived. The second terminal transmits a signal at a data rate $C_2^*$ to reduce error probability in an interference situation. The signal obtained by removing the signal transmitted by the second terminal from the signal received at the receiver is comprised of the signal transmitted by the first terminal and noise and thus can be expressed as equation 1. Equation 1 means that rate $C_1$ is achieved at a very low error probability.

FIG. 4 also shows the rate regions in the cases of allocating resources in time-division and frequency-division modes.

As shown in FIG. 4, if IC is not applied to the signals transmitted in the code-division mode, the data rate is achieved by performing decoding on the signals with the interference components, resulting in capacity reduction.

In the case of transmitting/receiving an LTE signal and an IoT signal on the same resources, the rate region may have the same form as that for the code-division mode of FIG. 4. For example, the code-division transmission mode is superior in view of capacity to the time-division transmission mode or frequency division transmission mode. The degree of performance enhancement depends on the IC technique to be applied. Thus, it is preferable to select an IC technique in consideration of implementation complexity and performance.

An embodiment of the present disclosure proposes an IC-enabled receiver with the least additional components to the configuration of the normal base station as shown in FIG. 3.

As described above, it may be possible to propose a base station with a unidirectional IC structure and operation method thereof that is capable of achieving performance gain by removing an LTE signal (having a large latency constraint and strong signal strength) from an IoT signal (transmitted at a relatively low transmit power) that is significantly affected by the LTE signal and by not removing the IoT signal from the LTE signal that is affected little by the IoT signal, in consideration of the difference of transmit powers of the LTE and IoT signals.

Figure 5:
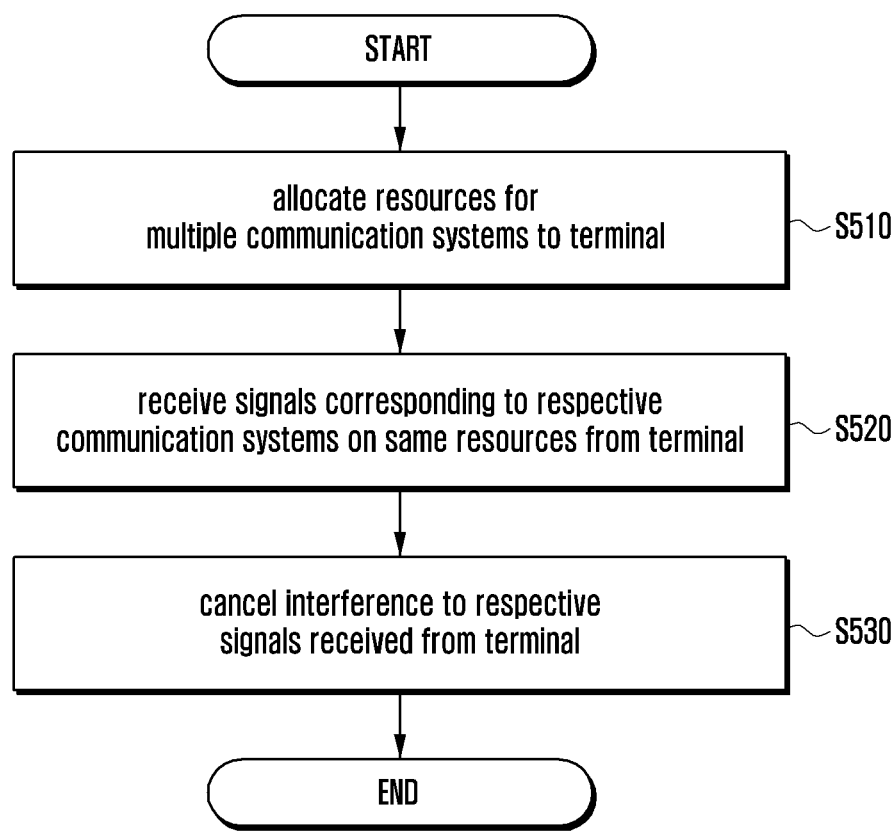
FIG. 5 is a flowchart illustrating an operation method of a base station according to an embodiment of the present disclosure.

FIG. 5 is a flowchart illustrating an operation method of a base station according to an embodiment of the present disclosure.

Referring to FIG. 5, the base station may allocate resources to a terminal supporting multiple communication systems in a system-specific manner at operation S510. For example, the base station may allocate to the terminal a first resource for use of a first communication system and a second resource for use of a second communication system. The first and second communication systems may be an LTE communication system and an IoT communication system, respectively. However, the present disclosure is not limited to this embodiment, and it may be applied to any combination of various types of communication systems.

At operation 520, the base station may receive system-specific signals transmitted by the terminal on the same resources. For example, the base station may allocate the resources for use of the first and second communication systems overlappingly when scheduling terminals. As a consequence, the base station may receive a first signal corresponding to the first communication system from a first terminal and a second signal corresponding to the second communication system from a second terminal. The first and second terminals may be identical with or different from each other.

The base station may cancel interferences from the received signals at operation S530. The base station may perform decoding on the received signal to regenerate the first signal and remove the first signal from the received signal to acquire the second signal from which interference is removed. In addition, the base station may perform decoding on the received signal to regenerate the second signal and remove the second signal from the received signal to acquire the first signal from which interference is removed. The base station may remove the second signal component from the first signal and remove the first signal component from the second signal for cancelling mutual interferences from each other.

It may also be possible for the base station to remove the second signal component from the first signal or remove the first signal component from the second signal. For example, the base station may remove the LTE signal from the received signal and then perform decoding on the interference-removed received signal to acquire the IoT signal, which is susceptible to interference from the LTE signal transmitted at a high transmit power level.

Figure 6:
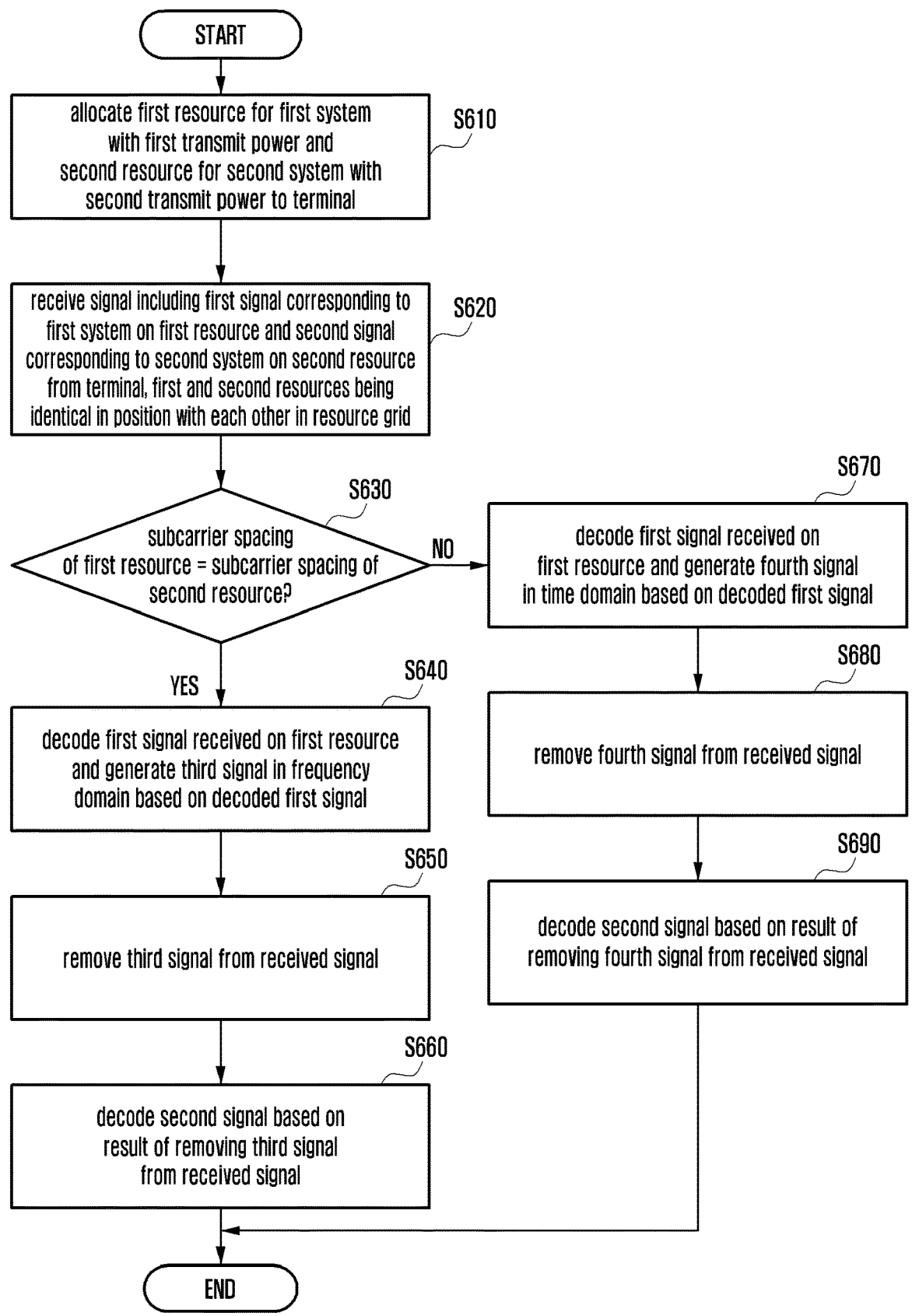
FIG. 6 is a flowchart illustrating an operation method of a base station according to another embodiment of the present disclosure.

FIG. 6 is a flowchart illustrating an operation method of a base station according to an embodiment of the present disclosure.

Referring to FIG. 6, at operation S610, the base station may allocate to a terminal a first resource for use of a first system requiring a first transmit power level and a second resource for use of a second system requiring a second transmit power level. For example, the base station may allocate resources to the terminal for use of multiple systems operating at power levels different over a threshold multiple.

At operation S620, the base station may receive from the terminal a signal including the first signal corresponding to the first system and a second signal corresponding to the second system on the first and second resources identical in position with each other in resource grid.

For example, the base station may allocate resources for use of multiple systems without distinction between bandwidths of the systems. As a consequence, the base station may receive the first and second signals on the same resources.

At operation S630, the base station may determine whether the subcarrier spacings of the first and second resources are identical with each other. The base station may notice the subcarrier spacings of the resources allocated to the terminal in the course of allocating the resources to the terminal.

For example, the base station may determine whether a number of terminals to allocate resources is equal to or greater than a predetermined threshold. If it is determined that the number of terminals is equal to or greater than the threshold, the base station may allocate resources based on the subcarrier spacing of 3.75 kHz.

It may also be possible for the base station to allocate resources to the terminals operating in the first communication system based on the subcarrier spacing of 15 kHz and to the terminals operating in the second communication system based on the subcarrier spacing of 3.75 kHz.

According to the determination result at operation S630, the procedure may go to operation S640 or operation S670.

If it is determined that the subcarrier spacings of the first and second resources are identical with each other, the base station performs decoding on the first signal received on the first resource to generate a third signal in the frequency domain based on the decoded first signal at operation S640. The base station may remove the third signal from the received signal at operation S650. At operation S660, the base station may perform decoding on the received signal from which the third signal is removed to recover the second signal.

If it is determined that the subcarrier spacings of the first and second resources are not identical with each other, the base station may perform decoding on the first signal received on the first resource to generate a fourth signal in the time domain at operation S670 based on the decoded first signal. The base station may remove the fourth signal from the received signal at operation S680. At operation S690, the base station may perform decoding on the received second signal from which the fourth signal is removed to recover the second signal.

A description is made of the method for applying an IC technique depending on whether the subscriber spacings of the first and second resources are identical with or different from each other.

Figure 7:
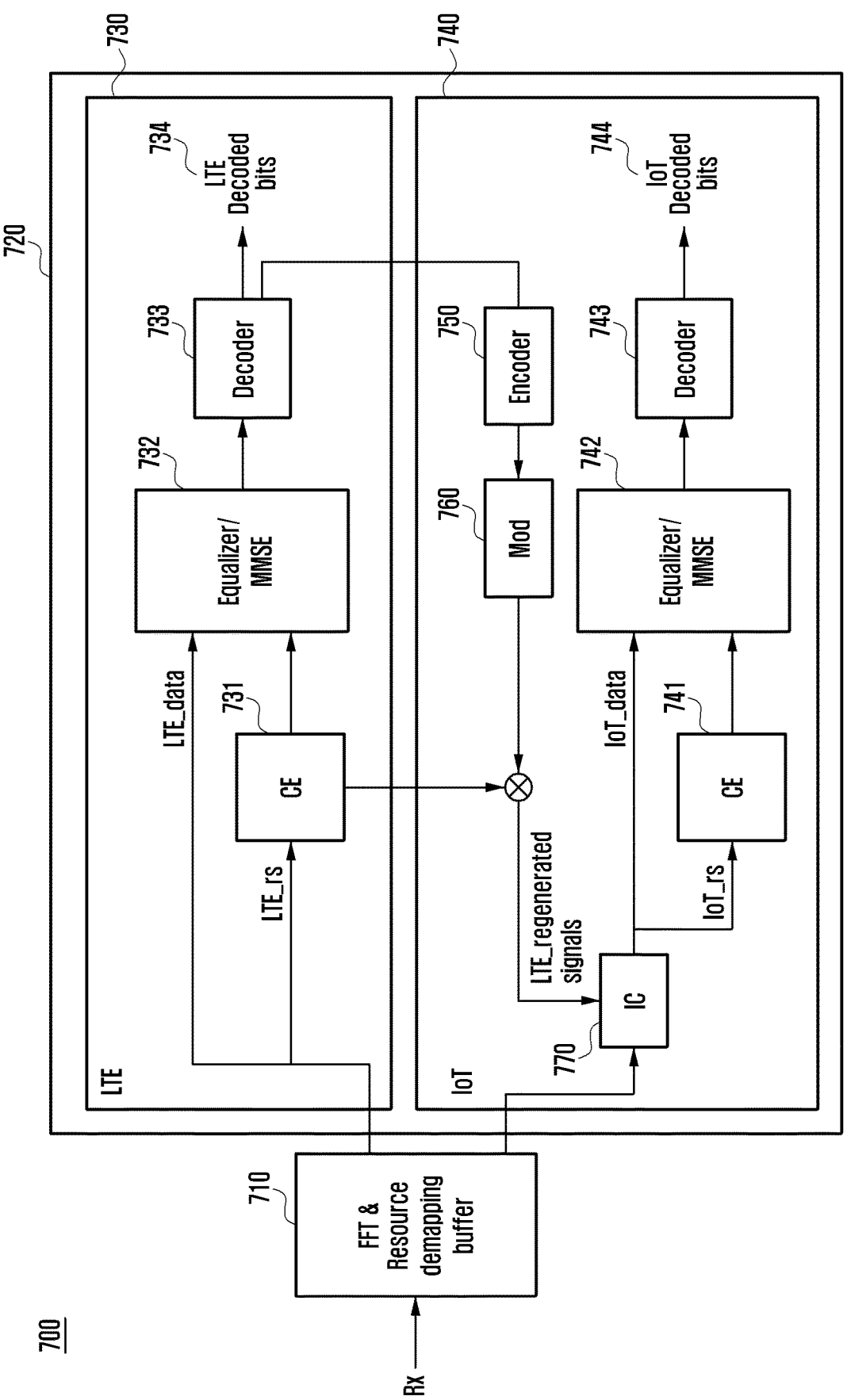
FIG. 7 is a diagram illustrating a system-specific uplink signal decoding process of a processor of a base station allocating a first and second resource based on a same subcarrier spacing according to an embodiment of the present disclosure.

FIG. 7 is a diagram illustrating a system-specific uplink signal decoding process of a processor of a base station allocating a first and second resource based on a same subcarrier spacing according to an embodiment of the present disclosure.

Referring to FIG. 7, the first and second systems may be an LTE system and an IoT system using the same subcarrier spacing of 15 kHz. A processor 700 of the base station may transmit the signal processed by an FFT & de-mapping buffer 710 to a signal processor 720.

The signal processor 720 may include an LTE signal processor 730 and an IoT signal processor 740. The LTE signal processor 730 and the IoT signal processor 740 may be implemented separately in hardware or as software entities or programs installed in the signal processor 720 implemented in hardware according to an embodiment of the present disclosure.

The LTE signal processor 730 may perform channel estimation on a received reference signal by means of a channel estimator 731. The LTE signal processor 730 may include an equalizer/minimum mean square error (MMSE) 732, which may perform equalization on the received data signal based on the channel estimation result. The LTE signal processor 730 may include a decoder 733, which may perform decoding on the equalized signal to output a decoded LTE signal 734.

The IoT signal processor 740 may process the decoded LTE signal 734 to regenerate in the frequency domain and remove the regenerated signal from the FFT'ed signal to recover the IoT signal.

For example, the IoT signal processor 740 may include an encoder 750 which performs encoding on the decoded LTE signal 734 and a modulator 760 which performs modulation to convert the encoded signal to an analog signal. The IoT signal processor 740 may regenerate the LTE signal in the frequency domain using the modulated signal and the channel estimation result from the channel estimator 731. The regenerated LTE signal is input to an interference canceller 770, which removes the regenerated LTE signal from the FFT'ed received signal.

After performing IC by removing the regenerated LTE signal from the FFT'ed received signal, the remaining signal may be comprised of the IoT signal and a noise component. The IoT signal processor 740 may process the signal that has passed the interference canceller 770 to decode the IoT signal in the same manner as the process for the case of receiving the LTE and IoT signals on different resources, e.g., the process described with reference to FIG. 3.

For example, a channel estimator 741 of the IoT signal processor 740 may perform channel estimation using the received signal from which the LTE signal has been removed, e.g., reference signal. An equalizer/MMSE 742 may perform equalization on the received data signal based on the channel estimation result. A decoder 743 may perform decoding on the equalized signal to output a decoded IoT signal 744.

Using the processor 700 configured as shown in FIG. 7, the base station may generate the decoded LTE signal 734 and an interference-canceled IoT signal 744 successfully.

Figure 8:
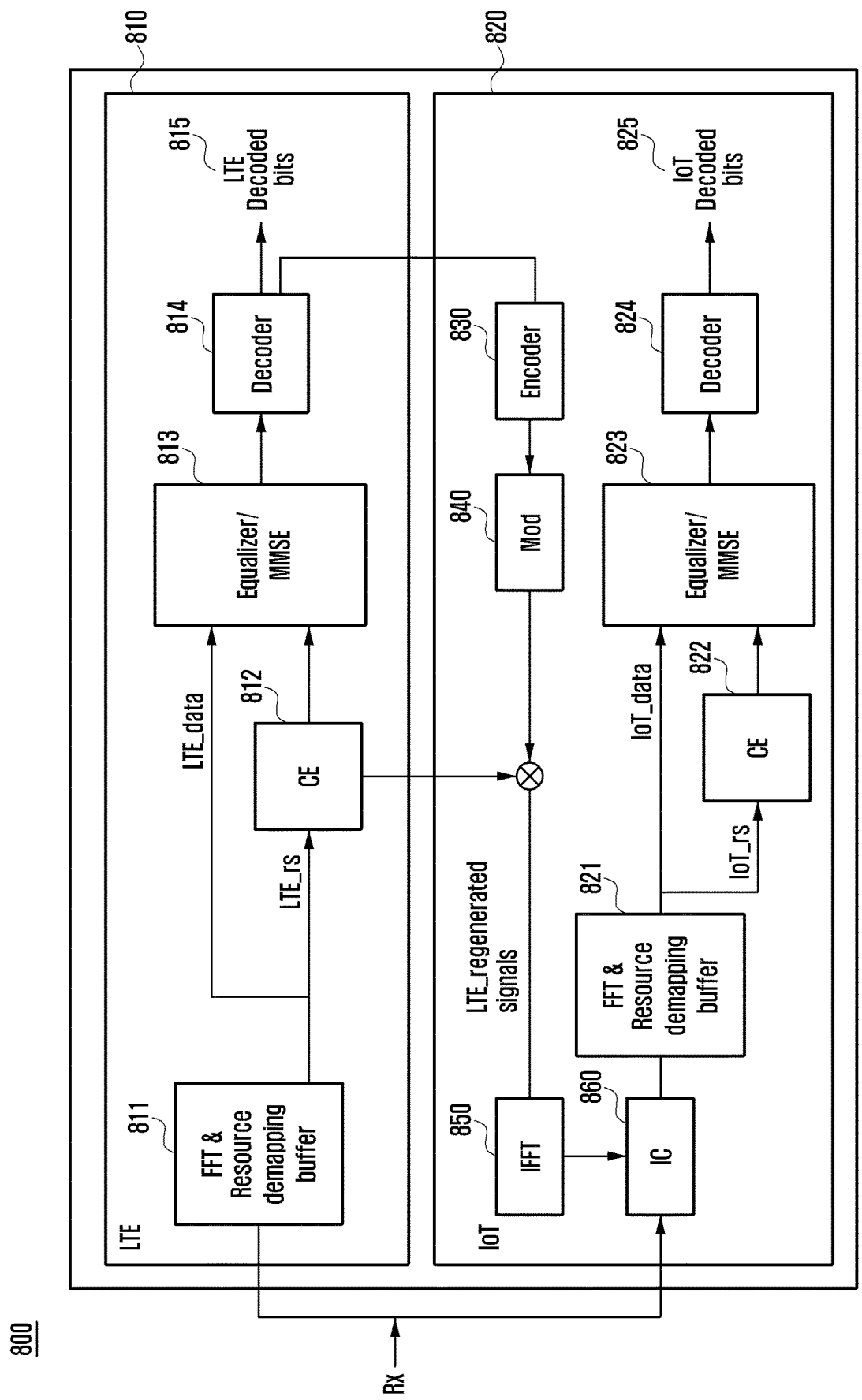
FIG. 8 is a diagram illustrating a system-specific uplink signal decoding process of a processor of a base station allocating a first and second resource based on different subcarrier spacings according to an embodiment of the present disclosure.

FIG. 8 is a diagram illustrating a system-specific uplink signal decoding process of a processor of a base station allocating a first and second resource based on different subcarrier spacings according to an embodiment of the present disclosure.

Referring to FIG. 8, the first system may be an LTE system with subcarrier spacing of 15 kHz and the second system may be an IoT system with a subcarrier spacing of 3.75 kHz. In this case, a processor 800 of the base station may process the LTE and IoT signals separately using FFT & de-mapping buffers matching the sampling rates of the respective signals.

If a received signal is input to the processor 800, an LTE signal processor 810 may perform FFT and de-mapping on the received signal by means of the FFT & de-mapping buffer 811.

The LTE signal processor 810 performs channel estimation on a received signal (reference signal) by means of a channel estimator 812. An equalizer/MMSE 813 may perform equalization on the received data signal based on the channel estimation result. A decoder 814 may perform decoding on the equalized signal to output a decoded LTE signal 815.

An IoT signal processor 820 may process the decoded LTE signal 815 to regenerate in the time domain and remove the regenerated signal from the received signal to recover the IoT signal.

For example, the IoT signal processor 820 may perform encoding on the decoded LTE signal 815 by means of an encoder 830 and then perform modulation on the encoding result by means of a modulator 840 to convert the encoded signal to an analog signal. The IoT signal processor 820 may perform inverse FFT (IFFT) on the analog signal to regenerate the LTE signal by means of an IFFT 850 using the modulated signal and channel estimation result.

In the embodiment of FIG. 8, the LTE and IoT signals are transmitted based on different subcarrier spacings. Thus, their frequency domain equivalents after being FFT'ed are different from each other too. Accordingly, the IoT signal processor 820 may perform IFFT by mean of an IFFT 850 to regenerate the decoded LTE signal as a time domain signal for IC.

The IoT signal processor 820 may remove the regenerated LTE signal from the received signal by means of an interference canceller 860. The IoT signal processor 820 may perform FFT & de-mapping on the interference-cancelled IoT signal by means of an FFT & de-mapping buffer 821 based on the subcarrier spacing of the IoT signal.

If the regenerated LTE signal is removed from the received signal through IC, the remaining signal may be comprised of the IoT signal and a noise component. Accordingly, the IoT signal processor 820 may perform FFT and de-mapping on the signal that has passed the interference canceller 860 to decode the IoT signal in the same manner as the process for the case of receiving the LTE and IoT signals on different resources.

For example, the IoT signal processor 820 may perform channel estimation by means of a channel estimator 822 using the received IoT signal from which the LTE signal has been removed, e.g., reference signal. An equalizer/MMSE 823 may perform equalization on the received data signal based on the channel estimation result. A decoder 824 may perform decoding on the equalized signal to output a decoded IoT signal 825.

Using the processor 800 configured as shown in FIG. 8, the base station may produce the decoded the LTE signal 815 and the decoded IoT signal 825 successfully.

A base station may include one or more processors configured as shown in the drawings. For example, if the base station supports carrier aggregation (CA), it may include the processors equal in number to the aggregated cells.

In view of the LTE system, the interference amount from an IoT signal to an LTE signal is relatively small and thus does not have any significant effect on the performance. In view of the LTE system, it may be possible to overcome the performance degradation problem by scheduling LTE and IoT terminals on the superposed resources.

In view of the IoT system, it may be possible to cancel interference by removing the LTE signal from the received signal. However, if IC is not performed perfectly, residual interference components may cause performance degradation. However, it should be noted that an IoT system is designed to operate at a low power level, e.g., in a noisy environment. Accordingly, the IoT signal is little affected by the residual interference components. In addition, because the IoT system is configured to operate in a basic operation mode of repeating transmissions on the same resources for the purpose of coverage extension, the performance degradation caused by such residual interference components may be overcome with a simple scheduling scheme, i.e., by increasing the number of repetitions.

In the above embodiments of the present disclosure, the description is directed to the case of removing the LTE signal from the received signal. However, it may also be possible to perform a mutual IC for removing the LTE and IoT signals from the received signal selectively for improving interference cancellation performance. It may also be possible to extend the IC scheme so as to cancel interference caused by several heterogeneous communication systems.

In the above embodiments of the present disclosure, consideration is given to performing IC by regenerating an output result of a decoder. However, it may also be possible to apply various techniques for regenerating signals to be removed with a soft decision value as an internal output of the decoder as well as performing regeneration with the decoded bits as a result of a hard decision.

The present disclosure is advantageous in terms of facilitating introduction of different types of communication services without increase of system bandwidth or reduction of resources of the legacy system. In addition, the present disclosure is advantageous in terms of introducing a new service with least modification of a reception part of a mode while maintaining the legacy system.

In addition, the base station of the present disclosure is advantageous in terms of supporting multiple communication system services without compromising resources for a normal communication system.

In addition, the base station of the present disclosure is advantageous in terms of improving reception performance by canceling interference between system-specific uplink signals.

The above-described components of the base station may be implemented in software. For example, the processor of the base station may include a flash memory or other nonvolatile memory. The nonvolatile memory may store programs for executing the functions of the processor.

The processor of the base station may be implemented in the form of including a CPU and a random access memory (RAM). The CPU may copy the programs from the nonvolatile memory to the RAM and execute the programs to carry out the corresponding functions of the terminal.

The processor is responsible for controlling the base station. The processor may be interchangeably referred to as central processing device, microprocessor controller, and operating system (OS). The processor of the base station may be implemented in the form of a system-on-a-chip or system on chip (SOC or SoC) integrating other functional parts, such as a communication module.

The base station control methods according to various embodiments of the present disclosure can be coded in software and stored in a non-transitory readable medium. Such a non-transitory readable medium may be mounted in various devices.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Although preferred embodiments of the disclosure have been described using specific terms, the specification and drawings are to be regarded in an illustrative rather than a restrictive sense in order to help understand the present disclosure, and it is obvious to those skilled in the art that various modifications and changes can be made thereto without departing from the broader spirit and scope of the disclosure and such modifications and changes should not be understood individually from the technical spirit or prospect of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An operation method of a base station, the method comprising:
    allocating a first resource for a first signal, corresponding to a first communication system, and a second resource for a second signal, corresponding to a second communication system, to at least one terminal, wherein the first resource and the second resource are identical in position with each other in a time domain and a frequency domain;

receiving a signal including the first signal and the second signal on the first resource and the second resource from the at least one terminal; and cancelling an interference from the received signal by removing one of the first signal and the second signal, wherein the first communication system operates based on a first transmission power and the second communication system operates based on a second transmission power, and wherein the one of the first signal and the second signal is determined based on the first transmission power and the second transmission power.

2. The method of claim 1, wherein the first transmission power is greater than the second transmission power.

3. The method of claim 2, wherein canceling interference comprises cancelling interference to the second signal by removing the first signal from the received signal.

4. The method of claim 3, wherein the canceling of the interference further comprises:
decoding the first signal;
generating a third signal based on the decoded first signal;
removing the third signal from the received signal; and
decoding the second signal based on a result of removing the third signal from the received signal.

5. The method of claim 1, further comprising:
determining whether a subcarrier spacing of the first resource and a subcarrier spacing of the second resource are identical; and
selecting a domain to perform interference cancellation on at least one of the first signal and the second signal depending on the determination result.

6. The method of claim 5, further comprising:
decoding, when the subcarrier spacing of the first resource and the subcarrier spacing of the second resource are identical, the first signal;
generating a third signal in the frequency domain based on the first signal;
removing the third signal from the received signal; and
decoding the second signal based on a result of removing the third signal from the received signal.

7. The method of claim 5, further comprising:
decoding, when the subcarrier spacing of the first resource and the subcarrier spacing of the second resource are not identical, the first signal;
generating a fourth signal in the time domain based on the first signal;
removing the fourth signal from the received signal; and
decoding the second signal based on a result of removing the fourth signal from the received signal.

8. The method of claim 1,
wherein the first communication system includes a long term evolution (LTE) communication system, and
wherein the second communication system includes an internet of things (IoT) communication system.

9. A base station comprising:
a transceiver configured to transmit and receive signals; and
at least one processor configured to:
allocate a first resource for a first signal, corresponding to a first communication system, and a second resource for a second signal, corresponding to a second communication system, to at least one terminal, wherein the first resource and the second resource are identical in position with each other in a time domain and a frequency domain, control the transceiver to receive a signal including the first signal corresponding to the first communication system and the second signal corresponding to the second communication system on the first resource and the second resource from the at least one terminal, and cancel an interference from the received signal by removing one of the first signal and the second signal, wherein the first communication system operates based on a first transmission power and the second communication system operates based on a second transmission power, and wherein the one of the first signal and the second signal is determined based on the first transmission power and the second transmission power.

10. The base station of claim 9, wherein the first transmission power is greater than the second transmission power.

11. The base station of claim 10, wherein the at least one processor is further configured to cancel the interference to the second signal by removing the first signal from the received signal.

12. The base station of claim 11, wherein the at least one processor is further configured to:
decode the first signal,
generate a third signal based on the decoded first signal,
remove the third signal from the received signal, and
decode the second signal based on a result of removing the third signal from the received signal.

13. The base station of claim 9, wherein the at least one processor is further configured to:
determine whether a subcarrier spacing of the first resource and a subcarrier spacing of the second resource are identical, and
select a domain to perform interference cancellation on at least one of the first signal and the second signal depending on the determination result.

14. The base station of claim 13, wherein the at least one processor is further configured to:
decode, when the subcarrier spacing of the first resource and the subcarrier spacing of the second resource are identical, the first signal,
generate a third signal in the frequency domain based on the first signal,
remove the third signal from the received signal, and
decode the second signal based on a result of removing the third signal from the received signal.

15. The base station of claim 13, wherein the at least one processor is further configured to:
decode, when the subcarrier spacing of the first resource and the subcarrier spacing of the second resource are not identical, the first signal,
generate a fourth signal in the time domain based on the first signal,
remove the fourth signal from the received signal, and
decode the second signal based on a result of removing the fourth signal from the received signal.

16. The base station of claim 9,
wherein the first communication system includes a long term evolution (LTE) communication system, and
wherein the second communication system includes an internet of things (IoT) communication system.

17. The base station of claim 9, wherein the at least one processor is further configured to:

perform decoding on the received signal to regenerate the first signal, and
remove the first signal from the received signal to acquire the second signal from which interference is removed.

18. The base station of claim 9, wherein the at least one processor is further configured to:
perform decoding on the received signal to regenerate the second signal, and
remove the second signal from the received signal to acquire the first signal from which interference is removed.

19. At least one non-transitory computer readable recording medium configured to store a program for executing a method for obtaining an image through an electronic device, the method comprising:
allocating a first resource for a first signal, corresponding to a first communication system, and a second resource for a second signal, corresponding to a second communication system, to at least one terminal, wherein the first resource and the second resource are identical in position with each other in a time domain and a frequency domain;
receiving a signal including the first signal and the second signal on the first resource and the second resource from the at least one terminal; and
cancelling an interference from the received signal by removing one of the first signal and the second signal,
wherein the first communication system operates based on a first transmission power and the second communication system operates based on a second transmission power, and
wherein the one of the first signal and the second signal is determined based on the first transmission power and the second transmission power.

* * * * *